Jan. 9, 1962  F. G. STEELE  3,015,960
SUPERCONDUCTIVE RESONANT CIRCUIT AND ACCELEROMETER
Filed Dec. 20, 1948  3 Sheets-Sheet 2

INVENTOR.
FLOYD G. STEELE
BY
Herbert E. Metcalf
ATTORNEY

Jan. 9, 1962 F. G. STEELE 3,015,960
SUPERCONDUCTIVE RESONANT CIRCUIT AND ACCELEROMETER
Filed Dec. 20, 1948 3 Sheets-Sheet 3

INVENTOR.
FLOYD G. STEELE
BY
ATTORNEY

United States Patent Office 3,015,960
Patented Jan. 9, 1962

3,015,960
SUPERCONDUCTIVE RESONANT CIRCUIT
AND ACCELEROMETER
Floyd G. Steele, Long Beach, Calif., assignor to Northrop
Corporation, a corporation of California
Filed Dec. 20, 1948, Ser. No. 66,383
27 Claims. (Cl. 73—517)

My invention relates to accelerometers, and more particularly to an accelerometer and circuit in which the inertial element is a modified electron gyro embodying certain broad principles of operation as shown, described and claimed in the Walker application, Serial No. 59,876, filed November 13, 1948, now Patent No. 2,871,703, issued Feb. 3, 1959, for a Gyro.

In the application above referred to, it was disclosed that a circular electron flow in a ring of superconductive material held at superconductive temperatures exhibited not only a strong gyro-static stability, but also that the electron flow was displaceable within the ring by axial accelerations of the ring. Certain circuits were described for measuring these accelerations. The device is called an electron gyro. The present invention is concerned primarily with electron distribution, conductor shapes and displacement sensing and measuring means in a modified electron gyro in order that displacements of an orbital frictionless electron flow in a superconductor due to acceleration alone can be controlled and measured with great accuracy.

It is, therefore, one of the objects of the present invention to provide an extremely accurate accelerometer for measuring accelerations along a predetermined line.

Accelerometers of prior types are based on the principle of movement of a relatively large mass in one or more directions while under resilient restraint, together with means for measuring the motion of the mass. Such devices have many factors reducing the accuracy thereof, such an anomalous frictional forces for example, hysteresis loses and temperature effects. Such prior known devices will herein be termed mechanical accelerometers in distinction to the device of the present invention that I desire to term an electron accelerometer, which is entirely frictionless and free from hysteresis effects.

Another object of the present invention is to provide a frictionless accelerometer in which all restoring forces are predictable and reproducible.

One of the most important uses for an accurate accelerometer is in automatic space navigation of vehicles such as aircraft.

If the generic height of a craft of moderately high speed be held nearly constant by, for example, an altimeter, then it can be shown that its motion in a trajectory between two points above the earth's surface can be uniquely specified, as a function of time, in terms of the direction of a plumb bob carried on board. The direction of the plumb bob can be given in most cases by angular reference to two star lines (e.g., the angles between the projected plumb bob line, or zenith, and the apparent lines to each star). The complements of these angles are apparent star altitudes, and specify the parallel planes in space which are normal to the plumb bob. Moreover, the azimuthal angles in these planes can be indexed against the apparent lines of bearing to the stars.

For any given track and time-schedule (determined on a map from tactical or meteorological considerations, for example) these apparent star altitudes at every instant of flight may be computed from available astronomical data. These computed results may be produced, or reproduced, on-board during flight, and fed into devices which lay down the specified apparent horizontal plane with respect to star lines physically established on-board by automatic star-tracking telescopes, free gyros, or combinations of these.

It can be shown that if at any instant the observed plumb bob coincides with the specified plumb bob, then the craft is either at the specified position on the trajectory or is accelerating towards that position. If the craft is initially displaced from the specified position, and its subsequent motion controlled so that the observed and specified plumb bobs always coincide, i.e., the plumb bob error is continually zero, then the craft will swing about the specified moving position as if it were an earth's radius pendulum. As a consequence, automatic celestial navigation, by controlling the craft so that the error signal of a plumb bob remains null, is possible and feasible.

In such a system, however, additional accuracy can be obtained by the use of electron gyros for determining and maintaining a position in inertial space as a substitute for star tracking telescopes. Furthermore, still further accuracy can be obtained by the use of electron accelerometers of the present invention as a substitute for the bubble levels in the navigation system above described. In addition, it can be demonstrated that two electron gyros pointed to and maintained at specified points in inertial space and three electron accelerometers used as seismic instruments, combined with a proper digital computer and a clock can navigate a vehicle accurately in inertial space within or without the earth's gravitational field in accordance with a predetermined flight plan. The Walker application cited above discloses an electron gyro suitable for this inertial space navigation system, and the present application provides the sufficiently accurate accelerometers and clocks. The complete system and the digital computer referred to are shown, described and claimed elsewhere.

The accelerometer of the present invention depends for its frictionless characteristics on the property known as superconductivity exhibited by certain metals and alloys at extremely low temperatures, and on the fact that electrons have appreciable mass.

The state of zero electrical resistance in many metals and alloys, known as superconductivity, is due to the appearance at very low temperatures of electrons endowed with the remarkable property of being able to travel through certain materials without the slightest trace of electrical friction. Such properties have been extensively investigated in various laboratories at temperatures as low as on the order of 1° K., obtained by boiling liquid helium, for example, in a cryostat.

In broad terms as to method, the present invention creates a circular, frictionless current flow in a predetermined orbit in space, and the displacement of said flow with respect to the predetermined orbit due to acceleration is accurately measured in terms of a change in self-inductance of the flow.

In broad terms as to apparatus, a current flow is maintained in a superconductive material having coaxial circular cross-sections and means are provided to measure a change in condition of the current flow with respect to the conductor under axial acceleration of the conductor.

One material that has the superconductive property at and below about 15° K. is columbium nitride. As this temperature is some 50% higher than, on the absolute scale of temperature, any previously known superconductor, it can be made superconducting in the temperature range attainable with liquid hydrogen alone; i.e., without the necessity of using liquid helium. This simplification makes superconductivity available in a relatively light cryostat suitable for aircraft use, one that can be initially charged, for example, with liquid hydrogen and which will maintain a constant temperature of 14° K. for many hours.

At modern aircraft speeds, for example, of 500 m.p.h. such a cryostat can maintain superconductivity temperatures over a range of 25,000 miles and at greater ranges at higher speeds, whereas at present guided missiles are contemplated with ranges in most cases of not greatly over 5,000 miles. The run-down time, in a superconducting circuit, of a current having a value of, for example, 200 amperes is not known. Superconduction currents have been known, however, to circulate freely in superconducting materials for 7 to 10 days without measurable change in intensity. It is thus clear that the aircraft type cryostat herein to be described has ample capacity to maintain superconductivity temperatures over any range at present possible for guided missile propulsion.

Inasmuch as known means of measuring the frequency of periodic oscillations are perhaps the most accurate measuring instruments presently available, I prefer to utilize the principles of superconductivity to create a frictionless tuned circuit, in which periodic oscillatory currents can be maintained. I preferably form a circulating orbital electron flow in a superconductive ring, and utilize self-inductance of the frictionless current in conjunction with a capacity to produce a tuned circuit. In order that the current may persist as long as superconductivity is present, I also make the capacity elements and the connections to the orbital electron flow of superconductive material also maintained at its superconductive temperature. I thus provide a tuned, periodic oscillation in a completely resistance free resonant circuit. Such a circuit alone is deemed to be novel, it has an extremely high Q, and in the absence of accelerations or when the orbital flow is properly confined to its conductor, forms perhaps the most stable oscillation circuit yet to be developed. For that reason such a superconductive oscillating circuit is ideally adapted for use as an extremely accurate time reference, or clock, merely by providing the superconductive oscillating circuit with a frequency measuring means. Many extremely accurate frequency measuring means are well-known in the art.

It is, therefore, another object of the present invention to provide an exceptionally stable, high Q oscillatory circuit.

At this point it should be pointed out that the stability of a superconductive tuned circuit, as formed in accordance with the present invention, is in no way due to temperature stabilization comparable to that previously obtained by the use of temperature maintaining ovens for example. It must be clearly understood that frequently stabilization in the device of the present invention is due to the absolutely resistance free condition of the entire circuit after the superconductive state is reached. Variations of temperature below that at which superconductivity is reached do not affect circuit stability. For example, a columbium nitride circuit becomes superconductive below about 14.5° K., which is the temperature of boiling liquid hydrogen in its triple state. At the temperature of liquid helium, i.e., about 1.8° K., the conditions in a columbium nitride circuit are not measurably different than at 14° K. Thus, it is clear that the stability of the superconductive resonant circuit of the present invention is not due to temperature stabilization when the threshold superconductive temperature has once been reached.

Having provided a novel and highly stable resistantless and resonant circuit, I then find I can make the self-inductance of the orbital circulating current change in accordance with acceleration forces applied to the electrons in the ring.

When an orbital circulating ring of electrons is present in a superconductor and the electrons are rotating coaxially therein, several internal factors can be recognized. The first is the centrifugal force of the electrons, which tends to keep the electrons in the largest orbit available in the conductor. The second is the mutually repelling forces of the electrons, which tend to spread out the current uniformly over paths that have the same radius; thirdly, the self-inductance of the current flow. The present application is concerned primarily with all three of these internal factors, and with a means and method of changing the relation of these factors by properly designing the geometry of the system so that the self-inductance of the system of the frictionless orbital electron flow can be changed by accelerations experienced in axial directions only.

It is, therefore, another object of the present invention to provide a means and method of changing the self-inductance of an electron gyro in accordance with axial accelerations experienced thereby in a predetermined direction, and further, to indicate such change in self-inductance as a change in frequency of a resonant circuit in which an electron gyro is an element.

However, it will be clear from the above that no presently known oscillating system will be as accurately stabilized as a resonant circuit formed of superconductive elements and held while energized at superconductive temperatures. Thus, any use of an external oscillator, for example, beating with the oscillations produced by a superconductive resonant circuit will be subject to whatever frequency error may be present in the external oscillator. For that reason I prefer to provide two superconductive resonant circuits, both held at superconductive temperatures and then to compare one with the other under various circumstances wherein the frequency of one or both are changed by application of external acceleration forces. The beat frequency produced by such a change in frequency is then an extremely accurate measurement of the applied forces.

It is another object of the invention to provide an accurate means and method of measuring the frequency of a tuned circuit.

When, however, two resistanceless resonators are used, they can readily be used in a push-pull relationship where the same acceleration reduces the frequency of one, and raises the frequency of the other. Under these circumstances, the beat frequency is a direct measure of the applied acceleration forces.

It is, therefore, another object of the present invention to provide a superconductive push-pull accelerometer system in which the output is a frequency change.

The advantages of an electron accelerometer as described above, over the conventional mechanical accelerometers already known, are manifold. The increased accuracy is due to many factors. For example, as the rotating electrons are held to their orbits by centrifugal force, the electron accelerometer is completely insensitive to accelerations across the axis of the electron ring or rings, a condition that is very unusual in mechanical accelerometers. No friction of any kind is present and the restoring forces have no hysteresis losses to change measurements, as are always present when springs or their equivalent are utilized to provide centering or restoring forces on the accelerated mass of a mechanical accelerometer. These and other objects and advantages of the present invention will be more fully understood by reference to the ensuing description of the invention in several preferred forms as shown in the drawings, in which:

As all of the modifications of the present invention involve the maintenance of their various circuits in a superconductive state, and as it is preferred to utilize the superconductive properties of columbium nitride at about 14° K. obtained by boiling liquid hydrogen, the invention will first be described in the form of a simple, high Q, oscillating circuit held at superconductive temperature in a cryostat.

Figure 1:
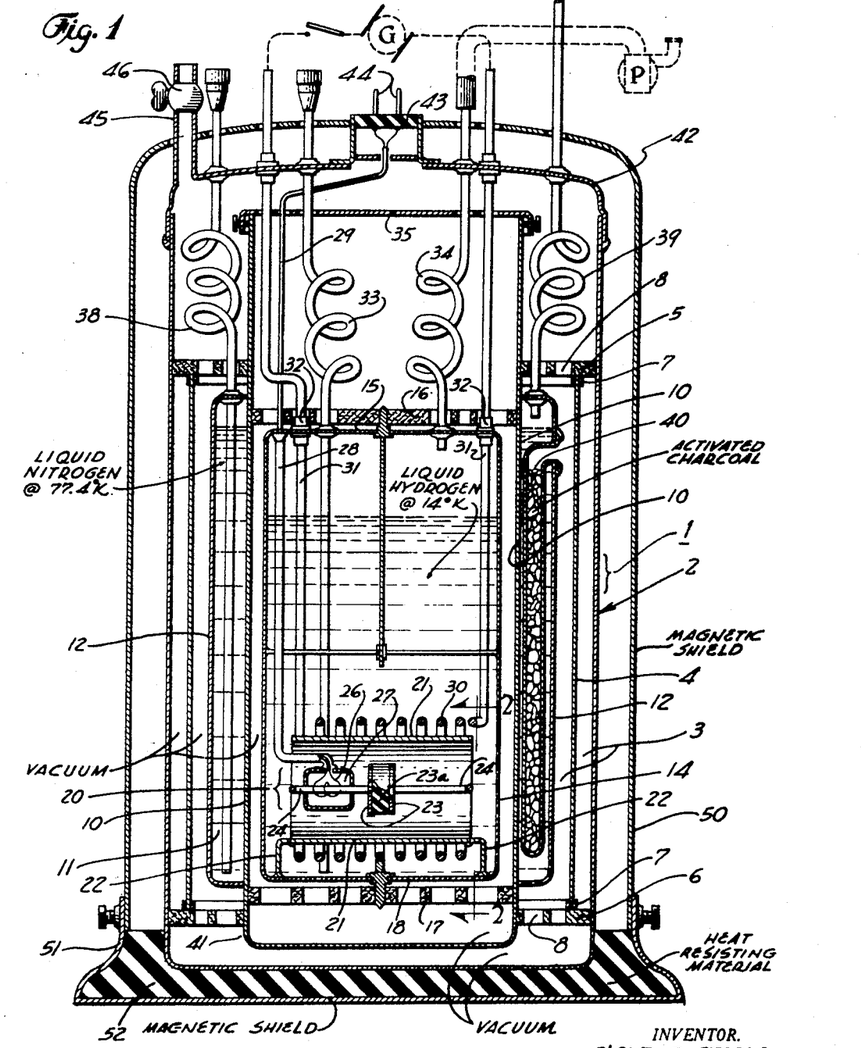
FIGURE 1 is a vertical sectional view, partly in elevation of a preferred form of cryostat utilized to obtain superconductivity in the device of the present invention, shown as containing a superconductive resonant circuit.

A preferred cryostat utilized to obtain superconductive temperatures in the practice of the present invention in its preferred forms is a modification of a liquid hydrogen cryostat developed for the U.S. Navy at Johns Hopkins University, Baltimore, Maryland, in 1947. This modified cryostat is shown in FIGURE 1 which will first be referred to.

The outside case of the cryostat 1 is a cylindrical shell 2 of Monel metal. This case provides the outer wall of a vacuum chamber 3 serving as thermal insulation for the elements inside, and also forms the principal mechanical support on which the other elements of the cryostat are suspended.

Within and concentric with the outside case there is a radiation shield 4 of polished aluminum. This shield is held in position by two thick annular "Masonite" rings 5 and 6, one press-fitted into each end of the shell 2. Inserted in the "Masonite" rings 5 and 6 are shoulders 7 which project to prevent the shield 2 from shifting transverse to the principal axis. The "Masonite" rings 5 and 6 insure thermal insulation between the outer case 2 and the shield 4.

In order further to decrease the heat leak by conduction, the rings 5 and 6 have slots 8 cut in them, arranged in such a manner as to provide a long path for any heat flowing through, while at the same time retaining structural strength.

Extending through and fitting snugly inside the rings 5 and 6 there is a copper cylinder 10 which forms the inner wall of a liquid nitrogen vessel 11.

Around the outside of the central and lower portion of the copper cylinder 10 there is mounted an outer vessel wall 12 of copper, the ends of which are turned inwardly and sealed to copper cylinder 10, thus forming the vessel 11 for holding the liquid nitrogen.

A container 14 for liquid hydrogen is formed from Monel metal and is located inside the copper cylinder 10 which forms the inner wall of the liquid nitrogen vessel 11 but is spaced therefrom. The top 15 of the container 14 is held in place by an insulating disc 16 of "Masonite," extended inwardly from copper cylinder 10. A second "Masonite" disc 17 holds the bottom 18 of the hydrogen container 14 in position by a press-fit of the second disc 17 into the copper cylinder 10 of the nitrogen vessel 11. The type of slotting arrangement used in the "Masonite" discs 16 and 17 is the same as that used in the "Masonite" annular rings 5 and 6.

Inside the hydrogen container 14, near the bottom thereof there is located an electron accelerometer assembly 20.

Figure 2:
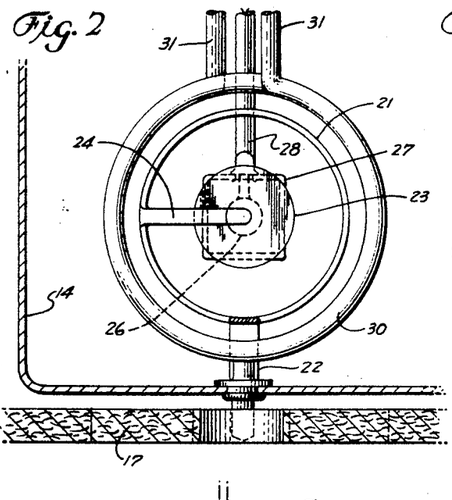
FIGURE 2 is a partial sectional view taken as indicated by the line 2—2 in FIGURE 1, certain elements being shown in elevation.

This accelerometer assembly 20 comprises a columbium nitride accelerometer cylinder 21 held with the axis thereof horizontal by copper end uprights 22 attached to the bottom of hydrogen container 14. This cylinder may be, for example, 6 inches long and 3 inches in diameter. A pair of spaced columbium nitride condenser plates 23 are centered within the accelerometer cylinder 21, with each plate connected to the adjacent end of the cylinder 21 by columbium nitride support wires 24. The accelerometer cylinder 21 can be mounted on copper, as the copper is not superconductive at 14° K., and, therefore, has an extremely high resistance as compared to the zero cylinder resistance when the latter is superconductive. I prefer to close the gap between condenser plates 23 with a dielectric block 23a to avoid capacity perturbations due to the possibility of hydrogen bubbles formed therebetween.

The accelerometer cylinder 21 can be formed, for example, from columbium metal sheet, presently available with an impurity specification of less than one percent. One method of preparing the formed cylinder is to first wash it with carbon tetrachloride to remove any grease. A stream of ammonia, after passing through a mercury bubbler and a calcium chloride dryer, enters through the top of a tube to be used for nitriding the cylinder. The gas passes out of the bottom of the tube and goes through a calcium chloride dryer, a safety trap, and is finally bubbled into water. When the air has been completely flushed away from the interior of the tube, a current is induced in the cylinder sufficient to raise the temperature therein to the desired level, 1200°–1400° C., which is maintained for about 45 minutes or more. This gives a nitrided cylinder with the desired properties.

The condenser plates 23 may be similarly nitrided and then supported on the columbium wires 24 which can then be nitrided as described above, but heated by conduction with a current passed through the cylinder and plate attachments, which may be welded. The cylinder may also be rolled up from sheet and welded, as it has been found that welds do not prevent superconductivity if the weld material is columbium, and is nitrided after welding.

Positioned around one of the columbium nitride wires 24 between one plate 23 and the cylinder 21 is a pickoff coil 26 enclosed in a casing 27 and having a tube 28 extending to the top of the hydrogen container to carry the cable 29 from coil 26 outside of the container. Thus, coil 26, which may be of copper, is at liquid hydrogen temperature but not in contact with the liquid, and is not superconductive. If the entire accelerometer assembly 20 is small, it may be entirely enclosed in a casing.

Also within the hydrogen container 14 is positioned an energizing coil 30 of heavy copper located in the best position to induce a current in the accelerometer cylinder 21, and leads 31 therefrom are sealed through top 15 of the hydrogen container 14 by insulating seals 32.

The liquid hydrogen container 14 is filled through a hydrogen filler tube 33 coiled above "Masonite" disc 16. Filler tube 33 is made of Super-Nickel and is sealed through top 15 and extends to the bottom of hydrogen container 14. There is also a similarly coiled hydrogen gas vent tube 34 also made of Super-Nickel sealed to top 15. This vent tube 34 also provides a convenient means of pumping down the liquid hydrogen to the triple point temperature, as will be described later.

The upper end of the copper cylinder 10 is then closed by a copper cap 35 through which copper filler tube 33, vent pipe 34 and leads 31 pass, as does cable 29 from coil 26. These passages, however, are not sealed. As cap 35 is held close to liquid nitrogen temperature, it acts as a top thermal shield for the hydrogen container.

The nitrogen vessel 11 is filled through a coiled nitrogen filler tube 38 extending to the bottom of nitrogen vessel 11, and also has a nitrogen coiled gas vent tube 39. Both tubes 38 and 39 extend upwardly to terminate outside the cryostat.

The nitrogen vessel 11 also contains two inset tubular traps 40 filled with activated charcoal, each tube being in connection with the vacuum chamber 3.

The region around the bottom of the hydrogen container 14 is protected by a thermal shield 41 formed as an extension of the copper cylinder 10 that is the inner wall of the liquid nitrogen vessel. At the liquid nitrogen temperature the shield gives off negligible radiation to any object inside of it, while at the same time it cuts off and absorbs radiated heat or conducted heat from the outside. Outside this shield there is a continuation of the vacuum chamber 3. Thus, the thermal shielding of the bottom of the hydrogen container is similar to that obtained at the top thereof where the upper portion of copper cylinder 10 and cap 35 act in the same manner as the thermal shield 41.

The outer Monel shell 2 is then closed and sealed by an upper Monel cap 42 through which the leads 31, the hydrogen filler tube 33 and hydrogen vent pipe 34 pass, as well as the nitrogen filler tube 38 and nitrogen vent tube 39 also pass, the tubes being sealed to cap 42 as by welding, for example, the leads 31 being insulated by ceramic seals. Cable 29 is connected to a hermetic connection plug 43, the outside prongs 44 of which serve to make connections to the coil 26. The Monel cap 42 is also provided with a vacuum connection 45 by which the open spaces of the cryostat can be evacuated.

These vacuum spaces, in the construction above described, exist completely around the nitrogen vessel 11 and also completely around the hydrogen container 14.

In the use of the device, a preliminary pumping is made of the vacuum spaces in the cryostat by means of a vacuum pump (not shown) attached to vacuum connection 45. In practice this preliminary pumping is used to reduce the pressure to slightly below one-tenth of a millimeter of mercury. The vacuum connected is then sealed off by a vacuum valve 46.

The liquid nitrogen vessel 11 is then filled through nitrogen filler tube 38 and this tube is capped. The nitrogen vent tube 39 is left open so that the nitrogen will remain at its boiling point at one atmosphere, i.e., 77.4° K. If and when the cryostat is to be used at high altitudes, known pressure regulating means can be utilized to maintain the constant desired pressure of one atmosphere on the liquid nitrogen.

The liquid hydrogen is then introduced through the liquid hydrogen filler tube 33 and the filler tube is capped.

A small vacuum pump P (indicated in FIGURE 1 by dotted lines) is then attached to the hydrogen vent pipe 34, and the hydrogen is boiled under reduced pressure until the triple state is reached with the hydrogen partly liquid and partly solid at a temperature of 14° K. This state is maintained by proper pressure regulation at the vacuum pump.

In subsequent operation, the charcoal traps 40 absorb the greater part of any residual air in the vacuum spaces, and the rest is frozen out on the liquid hydrogen container, so that an excellent vacuum is maintained at all times around the hydrogen and nitrogen containers.

At about 14.5° K. the entire accelerometer assembly of columbium nitride becomes superconductive.

Coil 30 is energized from a D.C. generator G shown in dotted lines, prior to the gyro ring reaching the superconductive state. Heating of the coil is negligible due to the large cross-section thereof. The magnetic field of coil 30 is terminated after the super-conductive state has been reached by sharply breaking the current passing therethrough. A persistent, frictionless and peripheral circulating current then flows in the superconductive accelerometer cylinder 21 as long as the cylinder is maintained in its state of superconductivity and is not influenced by an external magnetic field. For this latter reason, a magnetic shield 50 is placed around the entire cryostat to shield the circulating current from the earth's field, this magnetic shield mating with a base 51 also of magnetic material enclosing heat insulating material 52 on which the cryostat is supported.

The cryostat above described will maintain the hydrogen at the triple point for many hours with the accelerometer cylinder in a superconducting state. Approximately 20 liters of liquid hydrogen are required for this purpose, together with about 14 liters of liquid nitrogen when a six inch cylinder is used. With smaller cylinders a minimum of 5 liters of liquid hydrogen will last for 50 hours. Units of the type described have been subjected to severe mechanical strain, have stood up well under rugged treatment in the field and are thus ideally suitable for installation in aircraft.

When energized, a strong orbital circulating current exists in the superconducting acceleration cylinder 21, without trace of electrical resistance.

Due to the mutual repulsion of the electrons, they are spread out over the entire periphery of the cylinder substantially uniformly, as of course the cylinder is of uniform diameter throughout. The gyrostatic action of the device is negligible, as centrifugal force holds the electrons to circular paths, and tilting of the cylinder tends to lengthen the path and make it non-circular. In this respect, accurate circularity of the cylinder is important, as departures from circularity introduce current loss effects and lower run-down time.

Thus, with the axis of the cylinder at a right angle to the pull of gravity, and in the absence of axial acceleration of the cylinder, the self-inductance of the orbital current is constant. This self-inductance, when combined with the superconductive capacity and superconductive connections forms an exceptionally stable high Q resonant circuit. Oscillations are started in the L-C circuit by the initial charging of the cylinder with the circulating current and persist as long as this circulating current exists in the superconducting cylinder.

Only an extremely small amount of energy is abstracted from the superconductive circuit by the pickup coil 26, this energy being used in any known device for measuring frequency, the output being taken from prongs 44 of the cryostat. It is preferred that the output of the coil 26 be used as an input of a very high input impedance vacuum tube, in order that the energy loss from the superconductive circuit be held to a minimum. In spite of such an output loss, however, the circulating current will persist for sufficient time to provide a travel time far greater than presently possible aircraft ranges, and for stationary use, the circuit can be recharged as necessary both as to hydrogen and as to energy circulated in the superconductive circuit.

Figure 3:
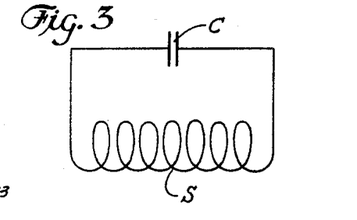
FIGURE 3 is a diagram of a crude mechanical analogy of the device of FIGURE 1, at rest.
Figure 4:
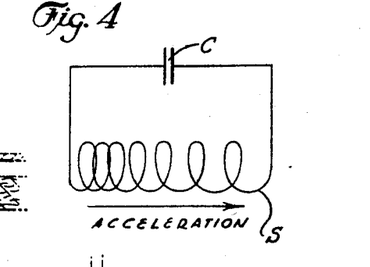
FIGURE 4 is a diagram of the analogy of FIGURE 3, shown as being under axial acceleration.

The device of FIGURE 1 is capable of responding to axial accelerations. A very crude mechanical analogy of the internal inductance conditions in the tuned circuit of FIGURE 1, when energized and operating at superconductive temperatures, is shown in FIGURES 3 and 4.

When the circulating current is started in cylinder 26, this current, being frictionless, is subject to the centrifugal and mutual repulsion forces of the electrons and thus spreads out over the surface of the cylinder as what may be considered to be a plurality of parallel, circular and coaxial electron rings. If the mutual repulsive forces existing between these rings be considered as the sole restoring force between the turns of a spring S subject to compression accelerations, then the inductance can be thought of as a spiral conductive spring suspended in space with a very small original turn positioning force, to create substantially equal spacing between turns when at rest, as shown in FIGURE 3. If then, axial accelerations are experienced by the spring, the turns will become compacted at one end of the spring and have larger than the original turn spacing at the other end of the spring. The overall self-inductance of the spring will rise, and this rise, when connected to the condenser C, will cause a lowering of the resonant frequency of the L-C circuit. It has been found that in a single L-C circuit of this type, about a 20% increase in self-inductance can be obtained by heavy accelerations. When the accelerations on the spring cease, the restoring forces between turns returns the spring to its original form, with a lowering of self-inductance and return to the original value. Unlike the spring, however, the electron rings in the cylinder exhibit no hysteresis loop during their movement, and the frequency change is an exact measure of the acceleration. This analogy is, of course, crude, as the electron paths are closed rings, but the rise in self-inductance can be explained as a crowding of these rings at the rear of the cylinder during acceleration.

As the electron rings all have the same radius, the only restoring forces are the mutual repulsion forces between electrons, and these forces are, of course, small. For this reason, electron ring position oscillations may take place in the cylinder as a function of current amplitude (electron mass) and length of cylinder. These oscillations, however, will only accidently be of the same frequency as that of the L-C circuit. The acceleration response of the circuit, however, will not be affected by such electron ring oscillations.

Figure 5:
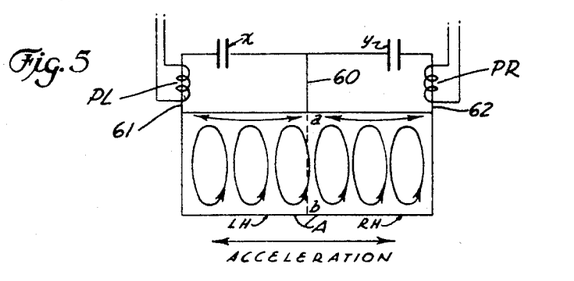
FIGURE 5 is a diagram of a cylindrical push-pull electron accelerometer.

However, when used as an accelerometer for use in aircraft, I prefer to form the superconductive circuit as shown in FIGURE 5, which in essence comprises two of the cylinders 21, as used in FIGURE 1, joined end to end to form a push-pull accelerometer cylinder A.

A common capacity connection 60 is made substantially exactly midway between the ends of the cylinder A to identical capacities X and Y. These capacities are connected on the opposite sides thereof to the cylinder ends by end connections 61 and 62 respectively. As in the device of FIGURE 1, capacities X and Y and connections 60, 61 and 62 are also of superconductive material such as columbium nitride. The left half LH of cylinder A is connected to capacity X to form a tuned circuit and the right half RH of cylinder A also forms a tuned circuit when connected to capacity Y. Preferably the resonant frequency of the two circuits is made identical to provide a zero beat frequency when they are oscillating. If desired, the spacing of one capacity X or Y can be made adjustable so that the two circuits can be readily made to oscillate at the same frequency.

After the cylinder A has been energized in the superconductive state by inducing a current therein, in the manner described for the cylinder of FIGURE 1, the circulating current, due to the mutual repulsion of the electrons, spreads out evenly around the periphery of the cylinder in what may be thought of as an infinite plurality of parallel coaxial circular electron paths as described for the cylinder of FIGURE 1. Furthermore, if the cylinder is properly divided, half of the electron paths will be, under zero acceleration conditions, in one half LH of the cylinder, and the other half of the current paths will be in the other half RH of the cylinder. Due to the self-regulating repulsive forces present in the electron flow the electron rings may also be thought of as being uniformly spaced axially in the two halves LH and RH in the absence of axial acceleration so that the self-inductance of both halves is identical. This being true, it follows that the resonant frequency of circuits XLH and YRH is the same.

Concerning the condition where the cylinder A is placed under axial acceleration, the electrons in the circulating current, having appreciable mass, tend to stand still and thus some of the electron rings pass across the center line $a$—$b$ of the cylinder so that there are fewer electrons and electron rings in half RH than in half LH. When this occurs, the self-inductance of half RH decreases and the self-inductance of half LH increases. Therefore, the frequency of circuit YRH increases and the frequency of circuit XLH decreases. If the frequencies be compared, a beat frequency is formed which is a direct measure of the acceleration experienced by the cylinder A. After acceleration ceases, the electrons return to their original uniform distribution by virtue of their mutual repulsion characteristics.

Figure 6:
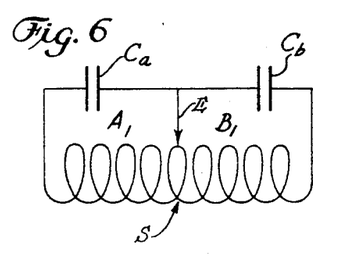
FIGURES 6 and 7 are diagrams showing crude mechanical analogy of the accelerometer of FIGURE 5 at rest and under acceleration respectively.
Figure 7:
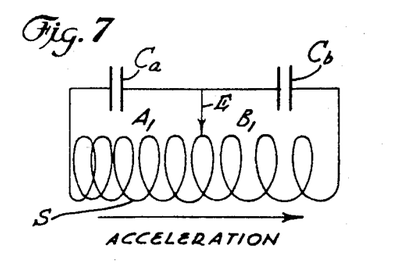

A crude mechanical analogy of the action of the electron accelerometer of FIGURE 5 is shown in FIGURES 6 and 7. Assume that the inductance of the two tuned circuits A and B, is a conductive spring S suspended in space by its two ends as described in conjunction with FIGURES 3 and 4. The two ends of the spring are connected to the respective outer plates of condensers Ca and Cb and the inner plates of these condensers are connected together and to a contact E positioned to contact the middle turn of the spring S, and to contact other turns of the spring if and when such turns are displaced laterally. It is also assumed that contact E will always be in contact with the spring, as shown in FIGURE 6.

The spring is to have a small but positive restoring force tending to keep the turns evenly spaced, in the absence of axial accelerations of the spring, and when in this condition, the two halves of the spring are assumed to have the same self-inductance so that at rest, the two tuned circuits $A_1$ and $B_1$ will have the same resonant frequency. This condition is shown in FIGURE 6.

It will then be assumed that the two circuits are accelerated to the right, as shown in FIGURE 7. Under these conditions, due to the inertia of the turns of the spring, the turns of the spring will move from circuit $B_1$ into circuit $A_1$ past the contact E. When this happens, the number of turns in circuit $A_1$ is greater than the number of turns in circuit $B_1$ and the frequency of circuit $A_1$ is lowered. The number of turns in circuit $B_1$ then being less than when at rest, the frequency is raised. The difference in frequency between the two circuits can then be measured as a beat frequency, which will be a direct measure of the acceleration encountered.

It may thus be considered that the uniformly spaced electron rings in the superconductive cylinder A of FIGURE 5 are shifted by axial accelerations from one side of the center line $ab$, thereby decreasing the frequency of circuit XLH and increasing the frequency of circuit YRH.

While the accelerometer of FIGURE 5 is extremely sensitive to small accelerations, it is also subject to axial oscillations of the electron rings, as no damping forces are present other than the small mutual repulsion of the electrons themselves. However, electron ring oscillations do not affect electrical oscillations of the L-C circuit. To increase the "stiffness" of the accelerometer, I prefer to vary the geometry of the accelerometer to impose an additional damping force on the device, and for this purpose I prefer to utilize the centrifugal force of the rotating electrons, as shown for example in FIGURE 8.

Figure 8:
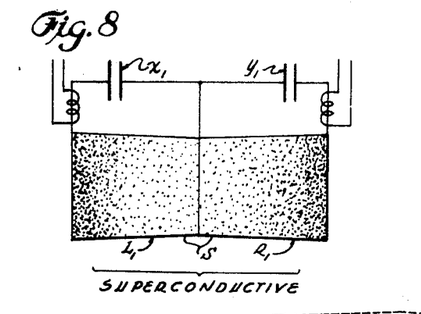
FIGURES 8 and 9 are diagrams showing several various geometries the electron accelerometer of the present invention can assume.

In FIGURE 8, the inductances are formed from two truncated superconductive and coaxial cones $L_1$ and $R_1$ joined at their small ends. The cones are identical as are the capacities $X_1$ and $Y_1$. In this case, an electron flow is induced in each cone, and due to the low angularity of the cones, these electron rings are confined by centrifugal force closer to the large ends of the cones than to the small ends. Any desired relation of centrifugal force and mutual repulsion forces can be obtained by changing the cone angles, and the greater the angle, the greater will be the restoring centrifugal force generated by the electrons, and the greater will be the acceleration required for the displacement of the electron rings within the cones.

The circuit of FIGURE 8 is a push-pull circuit under acceleration to the right for example. The electrons in cone $R_1$ will be moved toward the truncated apex of that cone, the rings becoming smaller in diameter and expanded, thereby changing the self-inductance of cone $R_1$. The electron rings in cone $L_1$, however, will become compacted and moved toward the outer end of the cone $L_1$. Thus, the frequency of circuit $R_1Y_1$ will show an appreciable change in one direction and the circuit $L_1X_1$ will change in frequency in the opposite direction. Any desired geometry between that of FIGURE 8 and that of FIGURE 5 can be utilized for various acceleration conditions as desired, and it is clear that sloping the sides of the main superconductor provides a strong damping and a controllable restoring force for the electron rings. The "stiffness" of the accelerometer can, therefore, be controlled.

Figure 9:
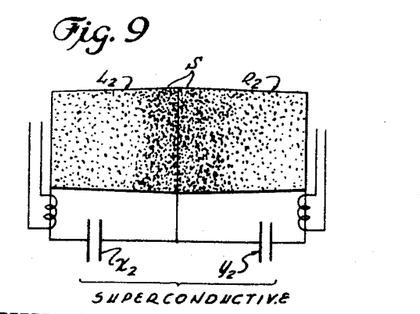

However, the device can also be made into a push-pull device as shown in FIGURE 9 where two truncated cones $L_2$ and $R_2$ are joined at their bases rather than at their small ends. In this case, only a single electron ring area is present which is stabilized near the center of the main conductor by centrifugal force, with the current equally divided between cones $L_2$ and $R_2$, thereby providing equal self-inductance in these cones and thus with equal condensers $X_2$ and $Y_2$, equal frequencies when energized at rest. Upon acceleration, as to the right, the electron rings will be displaced toward cone $L_2$, thereby raising the self-inductance of cone $L_2$ and lowering that of cone $R_2$. A difference in frequency results between circuit $X_2L_2$ and circuit $Y_2R_2$, which, as before recited, can be measured as a beat frequency. As in the embodiment of FIGURE 8, the stiffness of the accelerometer and the magnitude of the restoring forces can be controlled by changing the slope of cones $L_2$ and $R_2$.

Figure 10:
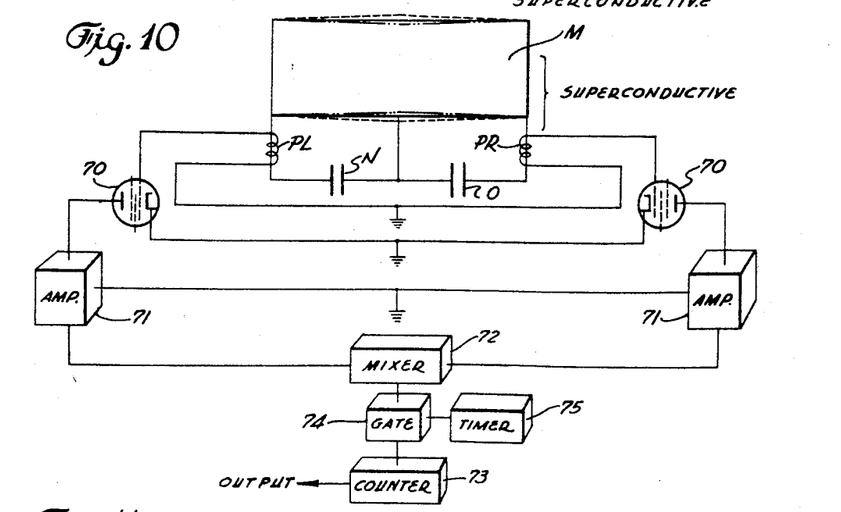
FIGURE 10 is a diagram of one measuring circuit that can be used in conjunction with the electron accelerometer geometries shown in FIGURES 5, 8 and 9.

One circuit preferred for obtaining and measuring the beat frequency between the two resonant circuits of FIGURES 5, 8 and 9, is shown in FIGURE 10. In this case, a pickup coil PL is placed around the connection between one end of the main superconductor M and the corresponding capacity N, and another pickup coil PR is placed around the other end connection of the superconductor M to the other capacity O. Each of these coils will pick up the frequency of the circuit it is coupled to.

Each coil PL and PR is connected to a high impedence pentode 70, the impedance thereof being as high as possible commensurate with consistent signal response, to reduce energy losses from the superconductive circuits.

The output of each pentode is passed through an amplifier 71 and then the output of both amplifiers is passed into a mixer stage 72 where the two frequencies are mixed to obtain the beat frequency. This beat frequency is then measured.

In automatic vehicle navigation, to facilitate computation and comparison, it is preferred to have control element outputs in terms of pulses per unit time. For that reason, I prefer to utilize a counter 73 connected to the mixer 72 through an electronic gate 74 under the control of a timer 75 so that the beat frequency can be counted for a specific length of time, say for one second, at regular intervals. The number of counts will then be a measure of the acceleration, and this number may then be used as desired for navigational purposes. Other means, however, of indicating the beat frequency when desired are deemed full equivalents.

Figure 11:
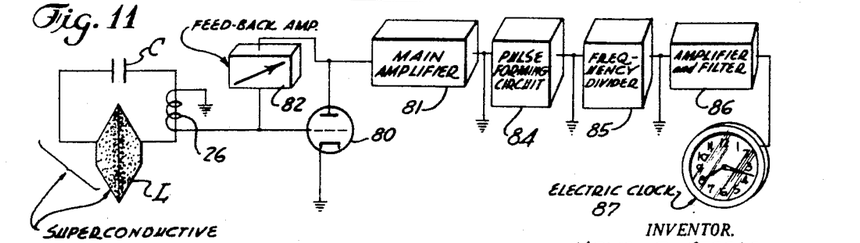
FIGURE 11 is a diagram of a clock circuit embodying the present invention.

All of the tuned circuits so far described have provided ample space in the superconductor for the electron rings to shift laterally under axial accelerations. Such constructions, therefore, make these tuned circuits unsuitable for use as a highly stable oscillating circuit or clock if any substantial axial acceleration force will be imparted to the circuit. For use as an extremely stable oscillating circuit, it is necessary to confine the electrons as closely as possible to a single orbital path. This can be done, for example, by making the cones of FIGURE 9 have very steep angles, thus confining the electrons closely to the equator of the circuit, as shown in FIGURE 11, thereby providing a very strong restoring force to withstand movements due to accelerations. Such a circuit is highly stable in the presence of moderate accelerations.

In FIGURE 11 the output from the inductance L and capacity C is taken from coil 26 and led to the grid of a high impedance input tube 80, the output of which energizes a main amplifier 81 and a feed-back amplifier 82, the output of the latter being variable, and fed back to coil 26 to reduce the energy pickup loss from the circulating current in the superconductive inductance L. In this manner energy losses can be still further reduced. The main amplifier 81 feeds into a pulse forming circuit 84, which in turn feeds a frequency divider 85 in which the high frequency of circuit L-C is reduced by division to a low frequency that can be handled by synchronous electric motor. This low frequency is then amplified and filtered in filter amplifier 86 and used to drive an electric clock 87. For space navigation use, the clock may be dispensed with, and the pulsed output of the amplifier 86 may be used as a time base supplying counters, as may be desired. Another highly stable superconductive clock circuit is shown, described and claimed in my co-pending application, Serial No. 71,327, filed January 17, 1949, and now Patent No. 2,704,431, issued March 22, 1955.

The size of the superconducting inductances in the superconductive resonant circuits, or circuit, is not critical and can be varied from ½-inch in diameter and one inch long to 12 inches in length or more, depending upon the frequency desired and sensitivity required. In some instances, weight of the cryostat and contents will dictate the size of the resonant circuit to be used. Small inductances are advantageous, as several accelerometers can be mounted in a single cryostat with their axes normal to each other for example, thereby saving the weight and cost of a cryostat for each accelerometer. Thus, I do not desire to be limited as to size, shape, or position of the inductances providing they comply with the principles of operation outlined herein.

While the present invention has been described herein as preferably utilizing the superconducting characteristics of columbium nitride at 14° K., as obtained by the use of evaporating liquid hydrogen, it is to be distinctly understood that many other electrical conductors become superconducting at still lower temperatures, such as temperatures that can be obtained by the use of evaporating liquid helium as a coolant. Such other superconducting materials are fully as suitable for use to produce the electron accelerometer of the present invention as is the columbium nitride circuits described herein. However, columbium nitride is more suitable for use in portable and transportable accelerometers, due to the higher temperature operation and availability of liquid hydrogen, and is preferred for such use. As the action of the device of the present invention is identical in any superconducting medium whatever the temperature required to produce the superconducting state, I do not desire to be limited to the use of columbium nitride or to the use of liquid hydrogen in the practice of my invention, as other superconducting materials are full equivalents, irrespective of the temperature at which superconductivity takes place.

Furthermore, I do not desire to be limited in any way to the particular manner herein described of forming the columbium nitride circuits, or to the particular nitriding process herein described as illustrative. Any form of circuit can be used that will provide an orbital current path with provision for current position shift. Published data is available on the fashioning of columbium bodies by the use of powder metallurgy and plating, together with satisfactory methods of nitriding such bodies. When lower temperatures are utilized, easily worked metals are available for the formation of the superconductive circuit without additional treatment.

From the above description and discussion it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the patent statutes, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its possible forms or modifications within the legitimate and valid scope of the appended claims.

What is claimed is:

1. An accelerometer comprising an oscillatory circuit including an extended hollow member having an annular cross-section, a capacity, conductors connecting said capacity across opposite edges of said member, said member, capacity and conductors being of a material capable of superconductivity, means for lowering the temperature of said member, capacity and connections to the superconductive state thereof, means for inducing a direct current circulating around a cross section of said extended member in its superconductive state to cause said circuit to oscillate and means for sensing alternating current flow in said circuit.

2. An accelerometer comprising an oscillatory circuit including an extended hollow member having an annular cross-section, a capacity, conductors connecting said capacity across opposite edges of said member, said member, capacity and conductors being of a material capable of superconductivity, means for lowering the temperature of said member, capacity and connections to the superconductive state thereof, means for inducing a direct current circulating around a cross section of said extended member in its superconductive state to cause said circuit to oscillate and means for measuring alternating current flow in said circuit.

3. An accelerometer comprising an oscillatory circuit including an extended member having a circular cross-section, a capacity, conductors connecting said capacity across a length of said member, said member, capacity and conductors being of a material capable of superconductivity, means for lowering the temperature of said member capacity and connections to the superconductive state thereof, said member being mounted to experience accelerations, and means for measuring a change in the oscillatory period of said circuit due to accelerations of said member in axial directions thereof.

4. An accelerometer wherein two coaxial oscillatory circuits are provided as set forth in claim 3 and wherein said period measuring means is a means for comparing the frequency of the two circuits.

5. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, and means for sensing the current flow in a portion of the superconductive material carrying current.

6. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, and means for sensing the current flow in a portion of said superconductive material carrying current, and means outside of said container for indicating the current sensed.

7. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, and means for measuring the frequency of the current flow in a portion of said superconductive material carrying current.

8. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, and means for measuring a change in frequency in the superconductive circuit.

9. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, means for measuring a change in frequency in the superconductive circuit, and means for indicating said change outside of said container.

10. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, and means for sensing current flow in a connection between said member and said capacity.

11. A stabilized oscillatory circuit comprising a cryostat, a container adapted to be cooled and maintained at a low temperature in said cryostat, an extended open ended member having all annular and closed cross-sections positioned in said container, a capacity, conducting connections between said capacity and a length of said member extending parallel to the axis of said member, said member, capacity and connections being of a material capable of superconductivity at the temperature attainable by said container, means in said container to induce a circulating current around a cross section of said member when energized, means for sensing current flow in a connection between said member and said capacity, and means for indicating the frequency of said current flow outside of said container.

12. An accelerometer comprising an extended member having all circular cross-sections, a first capacity connected between the middle of said member and one end thereof, a second capacity connected between said middle and the other end thereof thereby forming two oscillatory circuits, means for maintaining a frictionless unidirectional orbital current flow in said member, capacity and the connections therebetween, and means for separately sensing the oscillatory periods of each of said oscillatory circuits.

13. An accelerometer comprising an extended member having all circular cross-sections, a first capacity connected between the middle of said member and one end thereof, a second capacity connected between said middle and the other end thereof thereby forming two oscillatory circuits, means for maintaining a frictionless unidirectional orbital current flow in said member, capacity and the connections therebetween, means for separately sensing the oscillatory periods of each of said oscillatory circuits, and means for comparing the periods sensed.

14. An accelerometer comprising an extended member having all circular cross-sections, a first capacity connected between the middle of said member and one end thereof, a second capacity connected between said middle and the other end thereof thereby forming two oscillatory circuits, means for maintaining a frictionless current flow in said member, capacity and the connections therebetween, means for separately sensing the oscillatory periods of each superconductive circuit, and means for comparing the periods sensed to obtain the beat frequency therebetween.

15. An accelerometer comprising an extended member having all circular cross-sections, a first capacity connected between the middle of said member and one end thereof, a second capacity connected between said middle and the other end thereof thereby forming two oscillatory circuits, means for maintaining a frictionless current flow in said member, capacity and the connections therebetween, and means for measuring the beat frequency between said two circuits.

16. Apparatus in accordance with claim 15 wherein said member is mounted to experience acceleration.

17. Apparatus in accordance with claim 15 wherein said member is a cylinder.

18. Apparatus in accordance with claim 15 wherein said member is of opposed conical shape between said middle and said ends.

19. Apparatus in accordance with claim 15 wherein said member is of opposed conical shape between said middle and said ends, and wherein the largest sections of said cone shapes are joined at said middle.

20. Apparatus in accordance with claim 15 wherein said member is of opposed conical shape between said middle and said ends, and wherein the smallest sections of said cone shapes are joined at said middle.

21. Apparatus in accordance with claim 15 wherein said sensing means are coils positioned adjacent the connection between each capacity and an end of said member.

22. Apparatus in accordance with claim 15 wherein said sensing means are coils positioned around the connection between each capacity and an end of said member.

23. Apparatus in accordance with claim 15 wherein said member, capacities and connections are formed of columbium nitride, and wherein said container is adapted to maintain a temperature of 14° K.

24. An accelerometer comprising an extended member having coaxial circular cross sections, means for creating a frictionless orbital current flow therein, and means for measuring the frequency responses of separate lengths of said member extending parallel to the axis thereof, when said member is at rest and under axial acceleration.

25. An accelerometer comprising an extended member having coaxial circular cross sections, means for creating a frictionless orbital current flow therein, and means for measuring the frequency responses of equal and separate lengths of said member extending parallel to the axis thereof, when said member is at rest and under axial acceleration.

26. An accelerometer comprising an extended member having coaxial circular cross sections, means for creating a frictionless orbital current flow therein, and means for measuring the frequency responses of equal adjacent lengths of said member extending parallel to the axis thereof, when said member is at rest and under axial acceleration.

27. An accelerometer comprising an extended member having coaxial circular cross sections, means for creating a frictionless orbital current flow therein, and means for measuring the difference in frequency response due to axial acceleration of said member of equal adjacent lengths of said member extending parallel to the axis thereof.

References Cited in the file of this patent

UNITED STATES PATENTS

| | | |
|---|---|---|
| 685,012 | Tesla | Oct. 22, 1901 |
| 2,189,122 | Andrews | Feb. 6, 1940 |
| 2,389,004 | Schroeder | Nov. 13, 1945 |
| 2,457,620 | Abraham | Dec. 28, 1948 |
| 2,533,908 | Andrews | Dec. 12, 1950 |

OTHER REFERENCES

General Electric Review, June 1946, Superconductivity, by W. C. Hewlett, pp. 19 to 25.

Physical Review, vol. 70, Numbers 1 and 2, July 1 and 15, 1946, pages 97 and 98, Superconductivity of Lead at 3–Cm. Wavelength, by Bitter et al.

Physical Review, vol. 74, Number 9, November 1, 1948, page 1234, A Recent Study of the Infra-Red Sensitivity of Superconducting Bolometers, by Nelson Fuson.